US012645034B2

(12) United States Patent
Peng et al.

(10) Patent No.: US 12,645,034 B2
(45) Date of Patent: Jun. 2, 2026

(54) OPTICAL SYSTEM HAVING OPTICAL SUPPLY SUB-SYSTEM WITH REDUNDANT LIGHT SOURCE

(71) Applicant: HEWLETT PACKARD ENTERPRISE DEVELOPMENT LP, Spring, TX (US)

(72) Inventors: Yiwei Peng, Milpitas, CA (US); Stanley Cheung, Milpitas, CA (US); Geza Kurczveil, Santa Barbara, CA (US); Yuan Yuan, Milpitas, CA (US); Zhihong Huang, Milpitas, CA (US); Marco Fiorentino, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 307 days.

(21) Appl. No.: 18/358,468

(22) Filed: Jul. 25, 2023

(65) Prior Publication Data

US 2025/0035850 A1 Jan. 30, 2025

(51) Int. Cl.
| | |
|---|---|
| *G02B 6/293* | (2006.01) |
| *G02B 6/35* | (2006.01) |
| *G02F 1/025* | (2006.01) |

(52) U.S. Cl.
CPC ....... *G02B 6/29338* (2013.01); *G02B 6/3586* (2013.01); *G02F 1/025* (2013.01)

(58) Field of Classification Search
CPC .......................... G02B 6/29338; G02B 6/3586
See application file for complete search history.

(56) References Cited

U.S. PATENT DOCUMENTS

| | | | | |
|---|---|---|---|---|
| 5,173,957 A | * | 12/1992 | Bergano | ............ H01S 3/094003 |
| | | | | 385/24 |
| 7,447,387 B2 | * | 11/2008 | Shih | ......................... G02F 1/015 |
| | | | | 385/32 |
| 9,170,438 B2 | * | 10/2015 | Evans | ...................... G02F 1/025 |
| 9,247,624 B2 | * | 1/2016 | Tan | ......................... H05B 47/29 |
| 10,141,710 B2 | * | 11/2018 | Bovington | ............ H01S 5/1071 |
| 10,297,981 B2 | * | 5/2019 | Bovington | ............ H01S 5/1028 |
| 10,522,968 B2 | * | 12/2019 | Wen | ......................... H01S 5/142 |

(Continued)

OTHER PUBLICATIONS

Babic, D., "Reliability of vertical-cavity surface-emitting laser arrays with redundancy", 2021, 11 pages.

(Continued)

*Primary Examiner* — Rhonda S Peace
(74) *Attorney, Agent, or Firm* — Hewlett Packard Enterprise Patent Department

(57) ABSTRACT

An example optical system having an optical supply sub-system for supplying light to a photonic integrated circuit is presented. The optical supply sub-system includes a primary light source, an auxiliary light source, a first optical coupler, and a second optical coupler. The first optical coupler includes a first metal-oxide-semiconductor capacitor microring resonator (MOSCAP MRR) and the first optical coupler includes a second MOSCAP MRR. The first optical coupler is coupled to the primary light source and the photonic integrated circuit to control the propagation of the primary light to the photonic integrated circuit. The auxiliary light source may be configured to generate an auxiliary light when the primary light source malfunctions and the first MOSCAP MRR and the second MOSCAP MRR are controlled to control propagation of the auxiliary light from the auxiliary light source to the photonic integrated circuit.

20 Claims, 6 Drawing Sheets

(56) References Cited

U.S. PATENT DOCUMENTS

| | | | | |
|---|---|---|---|---|
| 12,339,498 B2 * | 6/2025 | Witzens | ............... | G02B 6/4246 |
| 12,355,494 B2 * | 7/2025 | Cheung | ............ | H04B 10/07955 |
| 2014/0210354 A1 * | 7/2014 | Tan | ........................ | H05B 47/20 |
| | | | | 315/151 |
| 2018/0159293 A1 * | 6/2018 | Bovington | ............ | H01S 5/5045 |
| 2018/0261983 A1 * | 9/2018 | Bovington | ............ | H01S 5/0085 |
| 2020/0382220 A1 * | 12/2020 | Leigh | ................... | G02B 6/4266 |
| 2024/0184180 A1 * | 6/2024 | Yuan | ....................... | G02F 1/212 |
| 2024/0204881 A1 * | 6/2024 | Cheung | ............ | H04B 10/07955 |
| 2025/0035850 A1 * | 1/2025 | Peng | ................. | G02B 6/29338 |

OTHER PUBLICATIONS

Cheung et al., "Demonstration of a 17×25 GB/s Heterogeneous III-V/Si DWDM Transmitter Based on (De-) Interleaved Quantum Dot Optical Frequency Combs", Journal of Lightwave Technology, vol. 40, No. 19, Oct. 1, 2022, pp. 6435-6435.
Descos et al., "Heterogeneous O-Band InAs/GaAs Quantum-Dot Optical Amplifier on Silicon", Asia Communications and Photonics Conference (ACP), 2021.
Huang et al., "Multi-Stage 8×8 Silicon Photonic Switch Based on Dual-Microring Switching Elements", Journal of Lightwave Technology, vol. 38, Issue: 2, Jan. 15, 2020.
Ibsen et al., "8- and 16-channel all-fiber DFB laser WDM transmitters with integrated pump redundancy", IEEE Photonics Technology Letters, Sep. 1999.
Kurczveil et al., "Hybrid Silicon Quantum Dot Comb Laser with Record Wide Comb Width", 2020, 1 pages.
Shi et al., "Silicon photonics for high-capacity data communications", Photonics Research, vol. 10,No. 9, Sep. 2022, 29 pages.
Srinivasan et al., "Non-invasive light monitoring for heterogeneous photonic integrated circuits", IEEE Photonics Conference (IPC), 2021.

* cited by examiner

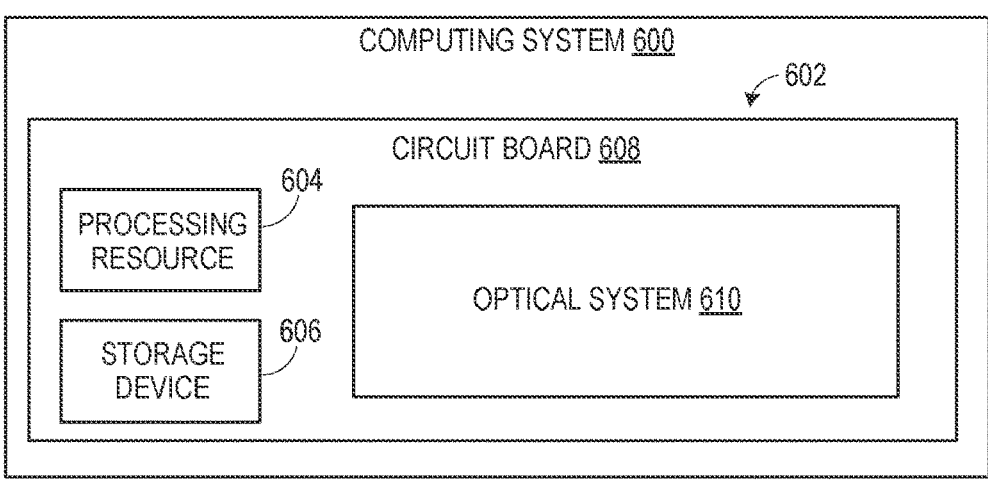

COMPUTING SYSTEM 600

602

CIRCUIT BOARD 608

PROCESSING RESOURCE 604

STORAGE DEVICE 606

OPTICAL SYSTEM 610

702
CAUSE THE PRIMARY LIGHT SOURCE TO GENERATE PRIMARY LIGHT

704
OPERATE A FIRST MOSCAP MRR IN A RESONANCE MODE

706
IS THE FIRST LIGHT SOURCE OPERATING IN THE FIRST MODE ?

708
CONTINUE TO OPERATE A FIRST MOSCAP MRR IN A RESONANCE MODE

710
TURN-ON AN AUXILIARY LIGHT SOURCE TO GENERATE AUXILIARY LIGHT

712
TURN OFF THE PRIMARY LIGHT SOURCE

714
OPERATE A SECOND MOSCAP MRR IN A RESONANCE MODE

*FIG. 7*

OPTICAL SYSTEM HAVING OPTICAL SUPPLY SUB-SYSTEM WITH REDUNDANT LIGHT SOURCE

BACKGROUND

Optical systems generally include an optical supply sub-system comprising light sources such as lasers to generate light. The light generated by the light sources may be supplied to several optical components disposed in a photonic integrated circuit. Photonic integrated circuits are considered an attractive solution for several applications such as data communication, optical neural networks, optical machine learning architectures, programmable photonic networks, etc. due to their large bandwidth, small size, and low loss. The optical supply sub-system may generally use semiconductor distributed feedback (DFB) lasers, distributed Bragg reflector (DBR) lasers, mode-locked lasers, or comb lasers. These lasers may generally have a direct one-to-one connection with optical communication channels (e.g., wavelength division multiplexing channels) implemented in the photonic integrated circuit. Such an implementation of the lasers and their connections with the photonic integrated circuit may inherently be vulnerable to failure or deterioration of the output of the lasers.

BRIEF DESCRIPTION OF THE DRAWINGS

Various examples will be described below with references to the following figures.

FIG. 6 depicts a block diagram of an example computing system.

FIG. 7 depicts a flow diagram of an example method for controlling supplying light to a photonic integrated circuit.

Figure 1:
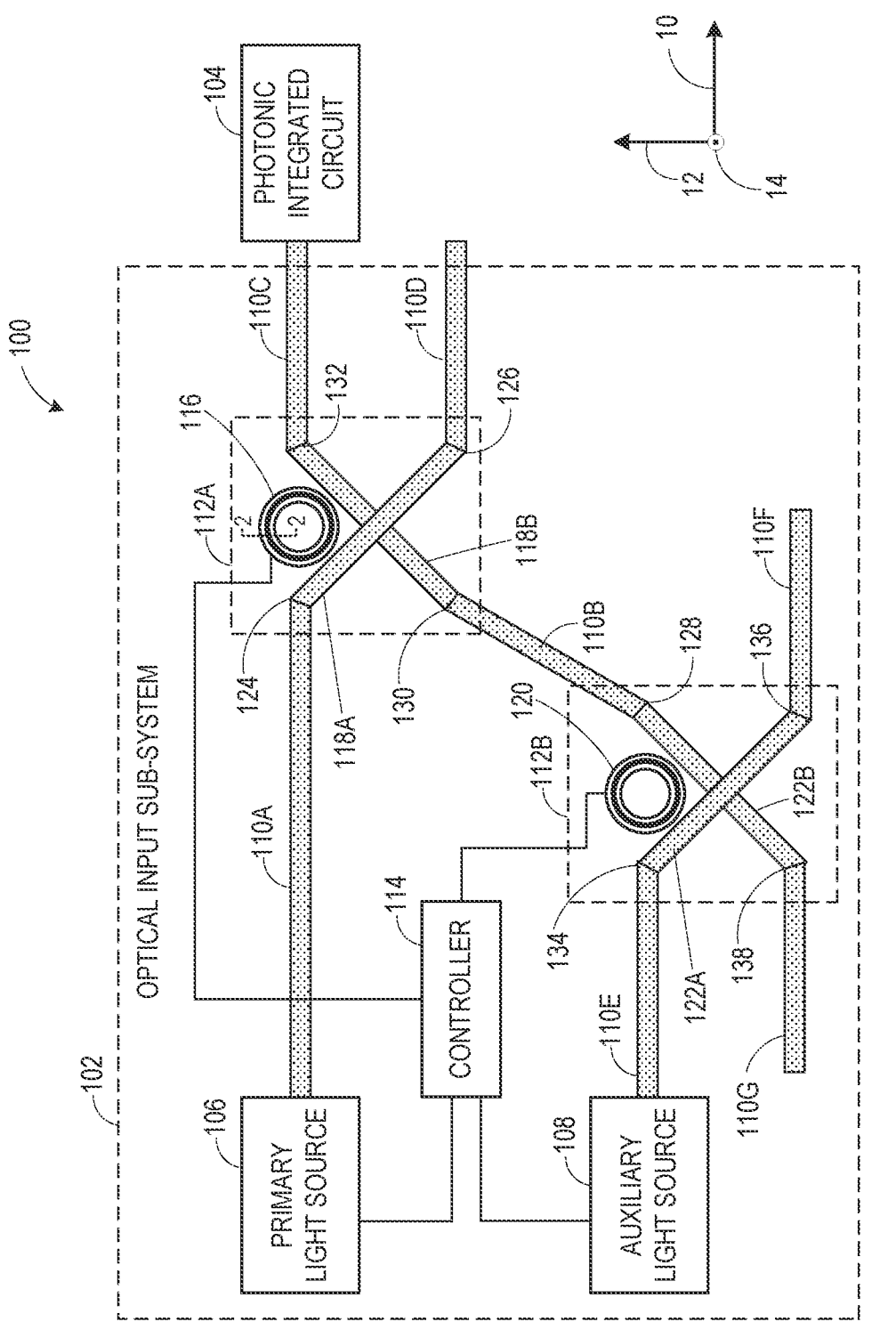
FIG. 1 depicts a schematic diagram of an example optical system.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Optical systems include optical devices that can generate, process, and/or carry optical signals from one point to another point. In certain implementations, optical systems such as optical communication systems may facilitate data communication over longer distances with higher bandwidth using a smaller cable width (or diameter) in comparison to communication systems using electrical wires. Optical systems generally include an optical supply sub-system comprising light sources such as lasers to generate light. The light generated by the light sources may be supplied to several optical components disposed in a photonic integrated circuit.

A malfunction of a light source in the optical supply sub-system may result in a complete or partial drop of optical power to the photonic integrated circuit, which in turn may result in loss of data transmitted on one or more optical channels. The malfunction may include a failure of the light source, the light source not generating optical power or any condition that prevents the light source from generating light as per its specifications. To maximize the reliability of the data communication circuits implemented in the photonic integrated circuit, high reliability is required of the optical supply sub-system. Because this level of reliability is very difficult to achieve with a single light source, the optical supply sub-system may include redundant light sources in the optical supply sub-system. Typically, the redundant light sources in such an implementation may include a primary light source and one or more auxiliary light sources. When the primary light source operates normally, the light generated by the primary light source may be supplied to the photonic integrated circuit. If the primary light source malfunctions, one of the auxiliary light sources may be operated to generate light, and such light generated by the auxiliary light source may be supplied to the photonic integrated circuit.

The redundant lasers in the optical supply sub-system require monitoring and controlling the propagation of light from each of the lasers to a photonic integrated circuit. To control the propagation of light from each of the lasers to the photonic integrated circuit, a known solution includes optical couplers that use heaters to control the propagation of the light from the lasers to the photonic integrated circuits. In particular, the heaters are operated by supplying current optical waveguide(s) within the optical coupler to locally heat the optical coupler material thereby modifying the local refractive index of the optical coupler and altering the light propagation. Also, such a solution requires external photodiodes to monitor the light generated by each laser and uses this information for controlling the lasers. However, heaters generally consume a lot of electrical power for their operation and the external photodiodes may occupy additional space which could otherwise be utilized to accommodate other optical components.

In examples consistent with the teachings of this disclosure, an optical system with an enhanced optical supply sub-system is provided. The proposed optical supply sub-system may control redundant light sources using reduced power and may have a reduced footprint as compared to the existing solutions. In an example implementation, the optical supply sub-system includes redundant light sources such as a primary light source and an auxiliary light source, and optical propagation control elements such as a first optical coupler and a second optical coupler. The first optical coupler is coupled between the primary light source and a photonic integrated circuit. Further, the second optical coupler is coupled between the auxiliary light source and the first optical coupler. One or both of the first optical coupler and the second optical coupler may be controlled to control the propagation of light generated by the primary light source or the photonic integrated circuit. Each of the first optical coupler and the second optical coupler include an integrated metal-oxide-semiconductor capacitor microring resonator (MOSCAP MRR) to control the propagation of the light.

During operation, the primary light source generates a primary light and the first optical coupler may be operated to enable the primary light to propagate to the photonic integrated circuit. The auxiliary light source may be operated to generate an auxiliary light when the primary light source malfunctions. In examples consistent with the teachings of this disclosure, the operations of the integrated MOSCAP MRRs in the first optical coupler and the second optical coupler may be controlled to allow the auxiliary light to propagate to the photonic integrated circuit.

Microring resonators (MRRs) are compact optical devices compared to Mach-Zehnder interferometers (MZIs). Accordingly, the proposed optical supply sub-system is smaller compared to the existing optical supply sub-systems that use MZIs. Further, MOSCAP MRRs may operate as a transparent power monitor. In particular, a MOSCAP MRR may be implemented with mid-bandgap defects that can convert absorbed photons into photo-generated carriers with minimal or no optical loss. A measurement of the conductance of the MOSCAP MRR is proportional to the light trapped in the MRR. Accordingly, the use of the MOSCAP MRR may also eliminate the need for external photodiodes for light monitoring, resulting in both space and cost savings.

In addition, the MOSCAP MRRs offer ultra-low power operation compared to other commonly used phase shifters such as heaters. In the MOSCAP MRR, power consumption does not increase with the number of failed light sources, while power consumption will scale linearly for heaters. In some instances, the MOSCAP MRR may as well be operated as an electrical memristor and have the potential to be a non-volatile device, which can remove the static bias requirement for operating the first and second couplers. Furthermore, compared to conventional MZIs, the MOSCAP MRR has smaller capacitance, and thus the switching speed is higher, resulting in reduced switching power consumption. Additionally, the proposed design of the optical supply sub-system may not require additional fabrication steps and can be easily fabricated by standard photonics foundries or applied on the current III-V/Si hybrid photonics platforms.

Referring now to the drawings, in FIG. 1, a schematic diagram of an example optical system 100 is depicted. The optical system 100 may be implemented for several applications such as data communication, optical neural networks, optical machine learning architectures, programmable photonic networks, etc. In one example, the optical system 100 may be implemented in electronic devices such as computers (stationary or portable), servers, storage systems, wireless access points, network switches, routers, docking stations, printers, or scanners. In FIG. 1, the arrows marked with reference numerals 10, 12, and 14 represent an axial direction, a lateral direction, and a vertical direction, respectively. The axial direction 10, the lateral direction 12, and the vertical direction 14 may be perpendicular to each other.

In an example implementation shown in FIG. 1, the optical system 100 includes an optical supply sub-system 102 and a photonic integrated circuit 104. The optical supply sub-system 102 is configured to supply light to the photonic integrated circuit 104 which the photonic integrated circuit 104 uses to accomplish several operations intended to be performed by the optical system 100. The photonic integrated circuit 104 may include several optical components (e.g., optical waveguides, optical couplers, optical modulators, optical weight banks, ring-resonators, photodetectors, etc.) that may be arranged in a suitable manner to accomplish several operations intended to be performed by the optical system 100. By way of example, the photonic integrated circuit 104 may include optical components arranged in suitable layouts to implement one or more of optical data communication systems, optical neural networks, optical machine learning architectures, or programmable photonic networks. It may be noted that the examples presented herein are not limited with respect to configuration specifics and functionalities of the photonic integrated circuit 104.

The optical supply sub-system 102 may include redundant light sources, for example, a primary light source 106 and an auxiliary light source 108. In an example implementation, the primary light source 106 and the auxiliary light source 108 may be lasers. During operation, the light generated by one of the primary light source 106 or the auxiliary light source 108 may be supplied to the photonic integrated circuit 104 for its intended functionalities. In the description hereinafter, the light generated by the primary light source 106 and the auxiliary light source 108 are referred to as a primary light and an auxiliary light, respectively.

In order to supply the primary light or the auxiliary light to the photonic integrated circuit 104, the optical supply sub-system 102 includes a network of optical waveguides 110A-110G, optical couplers such as a first optical coupler 112A and a second optical coupler 112B, and a controller 114. The optical waveguides 110A-110G may be bus waveguides that connect the optical couplers 112A and 112B to the photonic integrated circuit 104 and the light sources 106, 108, and are capable of allowing the primary light or the auxiliary light to propagate therethrough. The optical waveguides 110A-110G may be made of semiconductor materials such as silicon or other suitable materials that allow the primary light or the auxiliary light to propagate therethrough.

Although the optical system 100 is shown to include a particular number of light sources (e.g., the two light sources 106, 108), optical couplers (e.g., the two optical couplers 112A, 112B), waveguides (e.g., the seven waveguides 110A-110G), and the photonic integrated circuit (e.g., the single photonic integrated circuit 104), in some examples, the optical system 100 may be designed to include additional light sources, optical couplers, photonic integrated circuits, waveguides, etc.

As will be described in greater detail below, the controller 114 may be configured to control the operation of the light sources 106, 108 and the optical couplers 112A, 112B to control the supply of the primary light or the auxiliary light to the photonic integrated circuit 104. The controller may be implemented using a control logic, electronic circuits, an integrated circuit (IC) chip such as, but not limited to, an application-specific integrated circuit (ASIC), a field-programmable gate array (FPGA), a processor (e.g., central processing unit), a microcontroller, a special-purpose processor, or combinations thereof that include several electronic components. During the operation, the controller 114 may apply control signals to the light sources 106, 108 and the optical couplers 112A, 112B to control their respective functionalities.

In some examples, the controller 114 may include a storage device to store program instructions that when executed by the processor of the controller 114 cause the processor to perform operations intended to be performed by the controller 114. The storage device may be any electronic, magnetic, optical, or any other physical storage device that contains or stores instructions that are readable and executable by the processor. Thus, the storage device may be, for example, Random Access Memory (RAM), non-volatile RAM (NVRAM), an Electrically Erasable Programmable Read-Only Memory (EEPROM), a storage device, an optical disc, or the like. In some embodiments, the storage device may be a non-transitory storage device, where the term "non-transitory" does not encompass transitory propagating signals. In some examples, the processor may fetch, decode, and execute such instructions to control operations of the light sources 106, 108, and the optical couplers 112A and 112B thereby controlling the supply of the primary light or the auxiliary light to the photonic integrated circuit 104.

Each of the optical couplers 112A and 112B may include an integrated MOSCAP MRR (hereinafter referred to as MOSCAP MRR) and a pair of cross-configured optical waveguide arms. For example, the first optical coupler 112A may include a first MOSCAP MRR 116, and a first pair of optical waveguide arms including a first waveguide arm 118A and a second waveguide arm 118B. Similarly, the second optical coupler 112B may include a second MOSCAP MRR 120, and a first pair of optical waveguide arms including a third waveguide arm 122A and a fourth waveguide arm 122B. As will be described in greater detail in FIG. 2, a MOSCAP MRR (e.g., any of the MOSCAP MRRs 116, 120) may include a microring resonator that has an inbuilt capacitive structure (e.g., MOSCAP) that aids in controlling a coupling of light inside the microring resonator and/or monitoring the light trapped inside the microring resonator. The MOSCAP MRRs are compact compared to conventional MZIs. Therefore, compared to existing solutions that use MZI based light control arrangements, the use of the MOSCAP MRR based couplers may make the proposed optical supply sub-system 102 compact compared to the existing solutions that use MZIs. In addition, the MOSCAP MRRs offer ultra-low power operation compared to other commonly used phase shifters such as heaters. Moreover, compared to a conventional MZI, the MOSCAP MRR has smaller capacitance, and thus the switching speed is higher, resulting in a reduced switching power consumption for the proposed optical supply sub-system 102 compared to the existing solutions that use MZIs.

In the first optical coupler 112A, the waveguide arms 118A and 118B may be disposed in an isolated cross-configuration. The term isolated cross-configuration as used herein may refer to an arrangement of the optical waveguide where the optical waveguides may cross each other on separate planes and are optically isolated from each other. The optical isolation between the two waveguides may be achieved by way of physical separation between the two and/or by separating the two waveguides with light-blocking materials, such as reflective material, such that no light can be coupled between the two waveguides. Further, the waveguide arms 118A and 118B are formed adjacent to the first MOSCAP MRR 116 such that at least a portion of the waveguide arms 118A and 118B is disposed in close proximity with the first MOSCAP MRR 116 to allow evanescent coupling of the light with the MOSCAP MRR 116.

Similarly, the second optical coupler 112B may also include the second MOSCAP MRR 120, and the waveguide arms 122A and 122B that are arranged similarly as described in conjunction with the first optical coupler 112A. Structural details of the MOSCAP MRRs 116 and 120 are described in FIG. 2 with the help of a cross-sectional diagram of the MOSCAP MRR 116 taken at a location 2-2 marked in FIG. 1.

The optical waveguides 110A-110G may couple the optical couplers 112A, 112B with other optical components. For example, the first optical coupler 112A is coupled to the primary light source 106, the second optical coupler 112B, and the photonic integrated circuit 104, via the optical waveguides 110A, 110B, and 110C, respectively. In particular, the optical waveguide 110A is connected between the primary light source 106 and an end 124 of the first waveguide arm 118A of the first optical coupler 112A. Another end 126 of the first waveguide arm 118A may be left open, or connected to an optical detector (e.g., photodiode, not shown) via the optical waveguide 110D. Further, the optical waveguide 110B is connected between an end 128 of the fourth waveguide arm 122B and an end 130 of the second waveguide arm 118B. Further, the optical waveguide 110C connects end 132 of the second waveguide arm 118B with the photonic integrated circuit 104.

Further, the second optical coupler 112B is coupled to the auxiliary light source 108 and the first optical coupler 112A via the optical waveguides 110E and 110B, respectively. In particular, the optical waveguide 110E is connected between the auxiliary light source 108 and an end 134 of the third waveguide arm 122A of the second optical coupler 112B. Another end 136 of the third waveguide arm 122A may be left open, or connected to another optical detector (e.g., photodiode, not shown) via the optical waveguide 110F. Further, the optical waveguide 110B is connected between an end 128 of the fourth waveguide arm 122B and an end 130 of the second waveguide arm 118B. Another end 138 of the fourth waveguide arm 122B may be left open, or connected to a third optical coupler (not shown) via the optical waveguide 110G. In some examples, such a third optical coupler may be connected to another auxiliary light source (not shown).

As depicted in FIG. 1, the controller 114 is connected to the light sources 106, 108, and the MOSCAP MRRs 116 and 120 to control the supply of the primary light or the auxiliary light to the photonic integrated circuit 104. In particular, by controlling the application of control voltages to the MOSCAP MRRs 116 and 120, the MOSCAP MRRs 116 and 120 may be operated as optical switches, thereby controlling the propagation of the light therethrough. For example, to operate the optical couplers 112A and 112B as optical switches, the MOSCAP MRRs 116 and 120 may be operated in a resonant mode (also referred to as an optical ON-state) or an off-resonance mode (also referred to as an optical OFF-state).

In particular, for a MOSCAP MRR (e.g., any of the MOSCAP MRR 116 or 120), the resonance mode is an operating state of the MOSCAP MRR when a particular wavelength equal to a resonant wavelength resonates within the MOSCAP MRR and causes optical confinement inside the MOSCAP MRR. The resonant wavelength may be a wavelength at which the optical signal interferes constructively inside a ring resonator of the MOSCAP MRR and resonates within the ring resonator. When the wavelength of the light received by an optical coupler is the same as the resonant wavelength of the MOSCAP MRR in the optical coupler, the received light may couple into the MOSCAP MRR. In particular, at the resonant wavelength, the maximum light intensity may be observed inside the MOSCAP MRR. In contrast, the off-resonance mode is an operating state of the MOSCAP MRR when the light does not resonate inside the MRR causing no optical confinement inside the MOSCAP MRR compared to the resonance mode. Accordingly, in the off-resonance mode, the minimum light intensity may be observed inside the MOSCAP MRR.

The resonant wavelength for the MOSCAP MRR is a function of a refractive index of an annular waveguide of the MOSCAP MRR. In some examples, the controller 114 applies a control voltage to the MOSCAP MRRs 116 and 120 causing a change in the respective refractive indexes of the MOSCAP MRRs 116 and 120, which in turn alters their resonant wavelengths. In particular, to operate the MOSCAP MRR in the resonance mode, the controller 114 applies the control voltage to the MOSCAP MRR such that its resonant wavelength matches with the wavelength of the light received by the MOSCAP MRR from any of the light sources 106, 108.

In particular, to operate a MOSCAP MRR in the resonance mode, the controller 114 applies the control voltage and monitors the light inside the MOSCAP MRR. As will be described in greater detail in conjunction with FIG. 2, the MOSCAP MRR may be designed to have certain defect sites in a waveguide region that may absorb photons and cause the generation of free charge carriers relative to the intensity of the optical signal impinging on the defect sites. The conductance of the waveguide region depends on the amount of the free charge carriers, such that an increase in the optical signal causes an increase in the conductance of the waveguide region. This change in the conductance causes a change in the amount of current flowing through the MOSCAP MRR. Therefore, controller 114 measures the current passing through the MOSCAP MRR which is representative of the intensity of the light confined in the MOSCAP MRR.

The given MOSCAP MRR is considered to be operating in the resonance mode when a maximum light intensity is detected inside the MOSCAP MRR which is indicative of a resonance inside the given MOSCAP MRR. Further, to operate the given MOSCAP MRR in the off-resonance mode, the controller 114 applies the control voltage and monitors the light inside the MOSCAP MRR. The MOSCAP MRR is considered to be operating in the off-resonance mode when a minimum light intensity is detected inside the given MOSCAP MRR which is indicative of a minimum or no light confinement inside the given MOSCAP MRR. As will be appreciated, the use of such MOSCAP MRRs may eliminate the need for external light monitors such as external photodiodes for light monitoring, resulting in both space and cost savings.

The controller 114 may also use such monitoring of the light via the MOSCAP MRR 116 to determine if a given light source (e.g., the primary light source 106 or the auxiliary light source 108) is operating normally. For example, based on the light monitoring, if the controller 114 detects that the given light source is generating the light as per its specification (e.g., a specific light intensity for a given applied voltage to the given light source), the controller 114 determines that the given light source is operating normally. In the description hereinafter, such normal operation may be referred to as the given light source operating in a first state. However, if the controller 114, based on the light monitoring, detects that the given light source is not generating light as per its specification or that the light source has failed, the controller 114 determines that the given light source is operating abnormally. In the description hereinafter, such an abnormal operation may be referred to as the given light source operating in a second state.

During the start-up of the optical system 100, the controller 114 may turn on the primary light source 106, operate the MOSCAP MRR 116 of the first optical coupler 112A in a resonance mode, and keep the auxiliary light source 108 turned off. Accordingly, the primary light generated by the primary light source 106 propagates to the first optical coupler 112A via the optical waveguide 110A. The first waveguide arm 118A of the first optical coupler 112A receives the primary light from the optical waveguide 110A. The MOSCAP MRR 116 operating in the resonance mode causes the primary light to constructively interfere inside the MOSCAP MRR 116. In one example, in the resonance mode, all of the primary light may be trapped inside the MOSCAP MRR 116. The trapped light from the MOSCAP MRR 116 may evanescently couple into the second waveguide arm 118B, which may in turn propagate to the photonic integrated circuit 104 via the optical waveguide 110C.

As long as the primary light source 106 is determined to be operating in the first state, the controller 114 continues to operate the MOSCAP MRR 116 in the resonance mode thereby causing the primary light to propagate to the photonic integrated circuit 104. Also, for the duration that the primary light source 106 operates in the first state, the controller 114 may ensure that the auxiliary light source 108 is maintained turned off and the MOSCAP MRR 120 is operated in the off-resonance mode. To ensure that the auxiliary light source 108 is maintained turned off, in one example, the controller 114 may not supply power to the auxiliary light source 108. Further, to ensure that the MOSCAP MRR 120 is operated in the off-resonance mode, the controller 114 may adjust the voltage applied to the MOSCAP MRR 120 until a minimum light intensity is detected in the MOSCAP MRR 120.

While the primary light source 106 is operating to generate the primary light, the controller 114 may continue to monitor the primary light confined in the MOSCAP MRR 116. Based on the monitoring of the primary light, if the controller 114 determines that the primary light source 106 is operating in the second state (indicating an abnormal operation of the primary light source 106), the controller 114 may turn on the auxiliary light source 108 to generate the auxiliary light. In particular, responsive to determining that the primary light source 106 operates in the second state, the controller 114 may operate the MOSCAP MRR 116 in the off-resonance mode to stop the primary light from propagating to the photonic integrated circuit 104; turn on the auxiliary light source 108; and operate the MOSCAP MRR 120 in the resonance mode. The MOSCAP MRR 116, when operated in the off-resonance mode, optically isolates the first waveguide arm from the second waveguide arm as no light may be trapped inside the MOSCAP MRR 116.

As long as the auxiliary light source 108 is operational, the auxiliary light propagates to the second optical coupler 112B via the optical waveguide 110E. The third waveguide arm 122A in the second optical coupler 112B receives the auxiliary light from the optical waveguide 110E. The MOSCAP MRR 120 operating in the resonance mode causes the auxiliary light to trap inside the MOSCAP MRR 120. The trapped light from the MOSCAP MRR 120 may evanescently couple into the fourth waveguide arm 122B, which may in turn propagate to the first optical coupler 112A via the optical waveguide 110B. From the optical waveguide 110B, the auxiliary light may propagate to the photonic integrated circuit 104 through the optical waveguide 110C.

Figure 2:
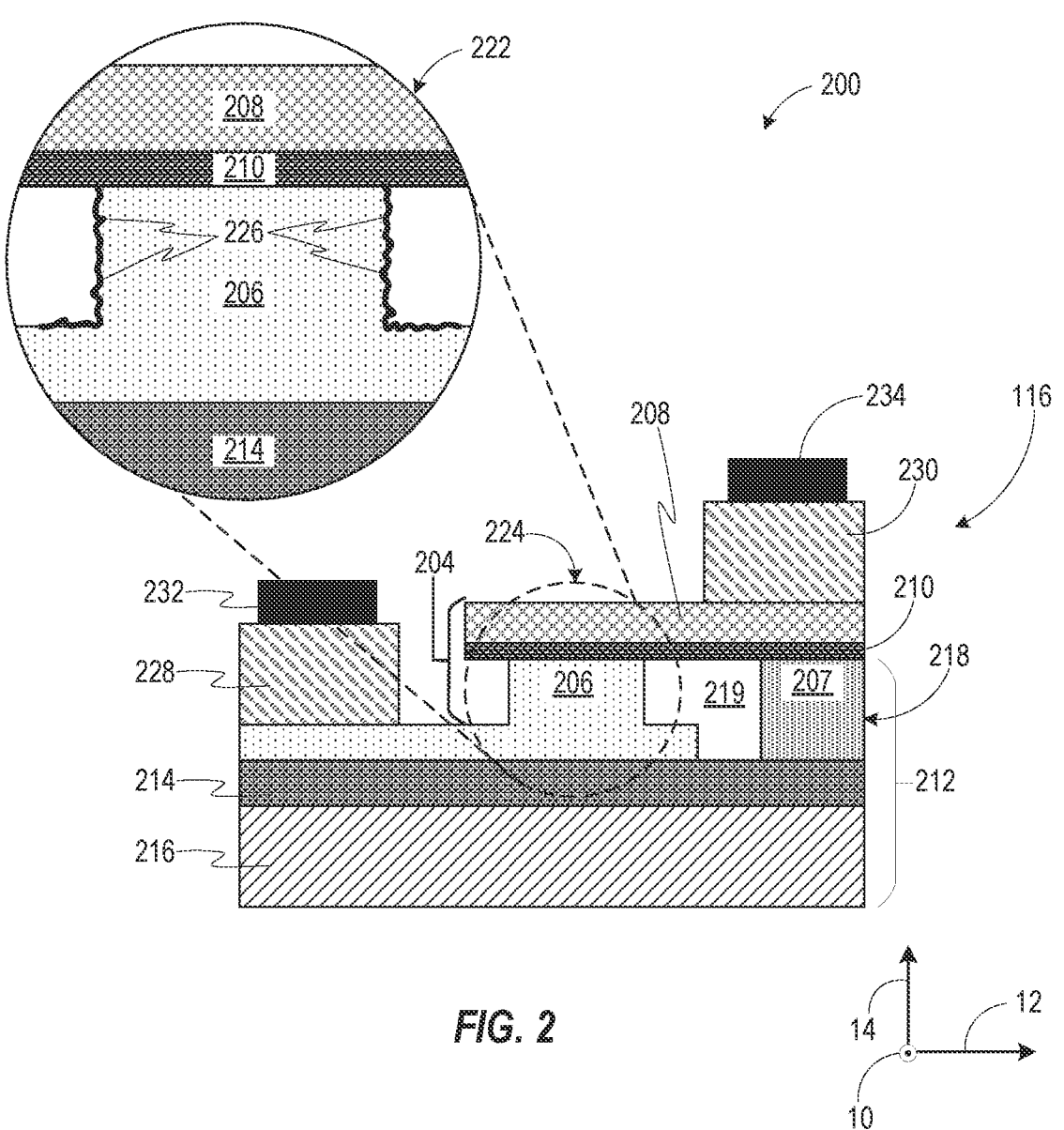
FIG. 2 depicts a cross-sectional view of an example metal-oxide-semiconductor capacitor microring resonator (MOSCAP MRR) used in the optical system of FIG. 1A.

In FIG. 2, a cross-sectional view 200 of the example MOSCAP MRR 116 is presented. It may be noted that the MOSCAP MRR 120 may also have a similar structure to the MOSCAP MRR 116 shown in FIG. 2. Further, in FIG. 2, the axial, lateral, and vertical directions are marked with the same reference numerals as used in FIG. 1 for ease of representation. In particular, the cross-sectional view 200 of the MOSCAP MRR 116 may be realized at a location 2-2 (marked in FIG. 1) when viewed in the lateral direction 12 (marked in FIG. 1).

The MOSCAP MRR 116 may include a waveguide region 206, a buffer semiconductor region 208, and an insulating layer 210 that may together define a capacitor structure such as a MOSCAP 204. In particular, the insulating layer 210 may be formed between the waveguide region 206 and the buffer semiconductor region 208 such that the insulating layer 210 may function as an electric insulator between two electrically conductive regions, namely, the waveguide region 206 and the buffer semiconductor region 208.

The MOSCAP MRR 116 may be formed using a substrate 212. The substrate 212 may include a base substrate layer 216 made of semiconductor material, for example, silicon (Si). Other examples of materials that may be used to form the base substrate layer 216 may include III-V semiconductors, such as indium phosphide (InP), germanium (Ge), gallium arsenide (GaAs), aluminum gallium arsenide (AlGaAs), indium gallium arsenide (InGaAs), indium arsenide (InAs), or combinations thereof. Further, as depicted in FIG. 2, the substrate 212 may include a base oxide layer 214 disposed on the underlying base substrate layer 216. In some examples, the base oxide layer 214 may be formed by oxidizing a top surface of the base substrate layer 216. As another example, the base oxide layer 214 may be deposited on the base substrate layer 216. In an example implementation of FIG. 2, the base substrate layer 216 may comprise silicon and the base oxide layer 214 may comprise silicon dioxide ($SiO_2$), wherein the base oxide layer 214 may be formed in the presence of oxygen at a temperature in the range from 900° C. to 1380° C. In some examples, the base oxide layer 214 may be a buried oxide (BOX) layer (e.g., Aluminum oxide ($Al_2O_3$) may be buried in the base substrate layer 216). Other examples of the base oxide layer 214 may alternatively be formed of Silicon Nitride ($Si_3N_4$), $SiO_2$, Hafnium Dioxide ($HfO_2$), diamond, silicon carbide (SiC), or combinations thereof.

Further, the substrate 212 may include a device layer 218 disposed on top of the base oxide layer 214. In the example implementation of FIG. 2, the device layer 218 may comprise silicon. The device layer 218 may be suitably shaped (e.g., via techniques such as photolithography and etching) to form one or more regions, such as, the waveguide region 206 and a non-waveguide region 207 separated via an air-trench 219. The waveguide region 206 is configured to carry an optical signal during the operation of the MOSCAP MRR 116. In some examples, the waveguide region 206 may include a first-type doping (e.g., p-type doping) or may be compensation doped to generate a net doping of the first-type. The waveguide region 206 may be lightly doped, resulting in improved sensitivity to a reference variable voltage applied by a controller (e.g., the controller 114) to measure light propagating inside the waveguide region 206.

In some examples, the waveguide region 206 may have several defect sites 226 as depicted in an enlarged view 222 of a portion 224 of the waveguide region 206). The term "defect sites" as used herein may refer to imperfections in the bulk of the material of the waveguide region 206, surface imperfections at the boundaries of the waveguide region 206, or both. In some examples, the defect sites may be formed as a result of imperfections in the manufacturing process and may be intentionally created. The defect sites 226 may absorb photons and cause the generation of free charge carriers relative to the intensity of the optical signal impinging thereon inside the waveguide region 206. The conductance of the waveguide region 206 depends on the amount of the free charge carriers, such that an increase in the optical signal causes an increase in the conductance of the waveguide region 206.

The insulating layer 210 is disposed at least on the waveguide region 206. In particular, the insulating layer 210 is formed such that the insulating layer 210 is sandwiched between the waveguide region 206 and the buffer semiconductor region 208. In some examples, the insulating layer 210 may be disposed over both the waveguide region 206 and the non-waveguide region 207. The insulating layer 210 may be formed of one or more dielectric materials, including but not limited to, native oxides of the materials of the waveguide region 206 or the buffer semiconductor region 208, or both, or external dielectric materials such as high-k dielectrics or polymers which can be formed by deposition, oxidation, wafer bonding or other dielectric coating methods. Other non-limiting examples of the dielectric materials that can be used to form the insulating layer 210 may include $SiO_2$, $Si_3N_4$, $Al_2O_3$, $HfO_2$, polyimide, Benzocyclobutene (BCB), or combinations thereof.

The buffer semiconductor region 208 may be made of semiconductor material, such as a III-V semiconductor. Examples of the III-V materials that may be used to form the buffer semiconductor region 208 may include GaAs, Gallium nitride (GaN), or Indium nitride (InN). The buffer semiconductor region 208 may be formed over the insulating layer 210 using techniques such as, but not limited to, deposition, wafer bonding, monolithic growth, or other fabrication techniques. In some examples, the buffer semiconductor region 208 may include a second-type doping (e.g., n-type doping) different from the first-type doping.

Furthermore, the MOSCAP MRR 116 may include contact regions such as a first contact region 228 and a second contact region 230. For illustration purposes, in FIG. 2, the contact regions 228 and 230 may be made of the same materials as that of the device layer 218 and the buffer semiconductor region 208, respectively. In some other examples, the contact regions 228 and 230 may be made of other semiconductor materials including, but not limited to, InP, Ge, GaAs, AlGaAs, InGaAs, or combinations thereof. The first contact region 228 may include the first-type doping and is disposed in contact with the waveguide region 206. Further, the second contact region 230 may include the second-type doping and is disposed in contact with the buffer semiconductor region 208.

In some examples, the contact region 228 may be formed in the device layer 218 by heavily doping a portion of the device layer 218 with the second-type doping. Also, in some examples, the contact region 230 may be formed in the buffer semiconductor region 208 by heavily doping a portion of the buffer semiconductor region 208 with the second-type doping. The contact regions 228 and 230 may be heavily doped compared to the waveguide region 206 and the buffer semiconductor region 208 to provide enhanced electrical connectivity with a first metal contact 232 and a second metal contact 234, respectively.

As depicted in FIG. 2, the first metal contact 232 and the second metal contact 234 are respectively disposed in electrical contact (e.g., in direct physical contact or via any intermediate electrically conductive material) with the first contact region 228 and the second contact region 230, respectively. In some examples, the metal contacts 232 and 234 may be formed on top of (i.e., vertically over) the first contact region 228 and the second contact region 230, respectively. Examples of materials used to form the metal contacts 232 and 234 may include copper (Cu), gold (Au), Al, and/or platinum (Pt). In the optical system 100, the controller 114 may be electrically connected to the contact regions 228 and 230 via respective metal contacts 232 and 234. The controller 114 may apply a control voltage to the MOSCAP MRR 116 via the metal contacts 232 and 234.

Depending on the polarity of the applied voltage to the metal contacts 232 and 234, the MOSCAP 204 may be operated in a charge carrier accumulation mode or a charge carrier depletion mode. In particular, when a forward bias control voltage is applied to the MOSCAP 204, the MOSCAP 204 may operate in a charge carrier accumulation mode. The term forward bias control voltage may refer to an application of the control voltage to the MOSCAP MRR 116 such that a positive potential (e.g., higher potential) appears at the metal contact 232 and a negative potential (e.g., lower potential) appears at the metal contact 234. In particular, when the MOSCAP 204 is operated under such forward bias control voltage, the free carriers (e.g., electrons in the buffer semiconductor region 208 and holes in the waveguide region 206) accumulate on either side of the insulating layer 210 due to a forward electric field caused by the control voltage.

When a reverse bias control voltage is applied to the MOSCAP 204, the MOSCAP 204 may operate in a charge carrier depletion mode. The term reverse bias control voltage may refer to an application of the control voltage to the MOSCAP MRR 116 such that a positive potential (e.g., higher potential) appears at the metal contact 234 and a negative potential (e.g., lower potential) appears at the metal contact 232. In particular, when the MOSCAP 204 is operated under such reverse bias control voltage, the free carriers (e.g., electrons in the buffer semiconductor region 208 and holes in the waveguide region 206) start to deplete on either side of the insulating layer 210 due to a reverse electric field caused by the control voltage.

Thus, the densities of electrons and holes, respectively, in the buffer semiconductor region 208 and the waveguide region 206 may increase with an increase in the control voltage and may decrease with a decrease in the control voltage. The increase in the charge carrier densities near the insulating layer 210 may reduce the refractive index of the MOSCAP 204. On the other hand, the decrease in the charge carrier densities near the insulating layer 210 may increase the refractive index of the MOSCAP 204. The change in the refractive index may cause a resonant wavelength of the MOSCAP MRR 116 to vary. In particular, as the wavelength is inversely proportional to the refractive index, the reduction in the refractive index may cause the resonant wavelength to increase, or vice-versa. Accordingly, the control voltage may be suitably controlled to induce a desired shift in a resonant wavelength for the MOSCAP MRR 116.

In some examples, the controller 114 may suitably vary the control voltage applied to the MOSCAP MRR 116, to match the resonant wavelength of the MOSCAP MRR 116 with the wavelength of the light (e.g., the primary light) thereby causing the primary light to couple into the MOSCAP MRR 116 and the controller 114 detecting the maximum optical power inside the MOSCAP MRR. With such coupling of the primary light into the MOSCAP MRR 116, the MOSCAP MRR 116 is considered to be operating in the resonance mode. On the other hand, to operate the MOSCAP MRR 116 in the off-resonance mode, the controller 114 may suitably vary the control voltage until the controller 114 detects no (or minimal) optical power inside the MOSCAP MRR 116. Accordingly, when the optical power inside reduces to zero or below a certain threshold value, the MOSCAP MRR 116 is considered to be operating in the off-resonance mode.

Further, in some examples, the controller 114 may use the MOSCAP MRR 116 to monitor the light. In particular, during the operation of the MOSCAP MRR 116, the defect sites 226 in the waveguide region 206 may absorb photons and cause the generation of free charge carriers relative to the intensity of the optical signal impinging thereon inside the waveguide region 206. The conductance of the waveguide region 206 depends on the amount of the free charge carriers, such that an increase in the optical signal causes an increase in the conductance of the waveguide region 206. Consequently, the current flowing through the MOSCAP MRR 116 may vary. In particular, a change in the current passing through the MOSCAP MRR may be indicative of a change in the light intensity inside the waveguide region 206. The controller 114 may measure such current passing through the MOSCAP MRR 116 to determine the intensity of the primary light trapped inside the waveguide region 206.

Figure 3:
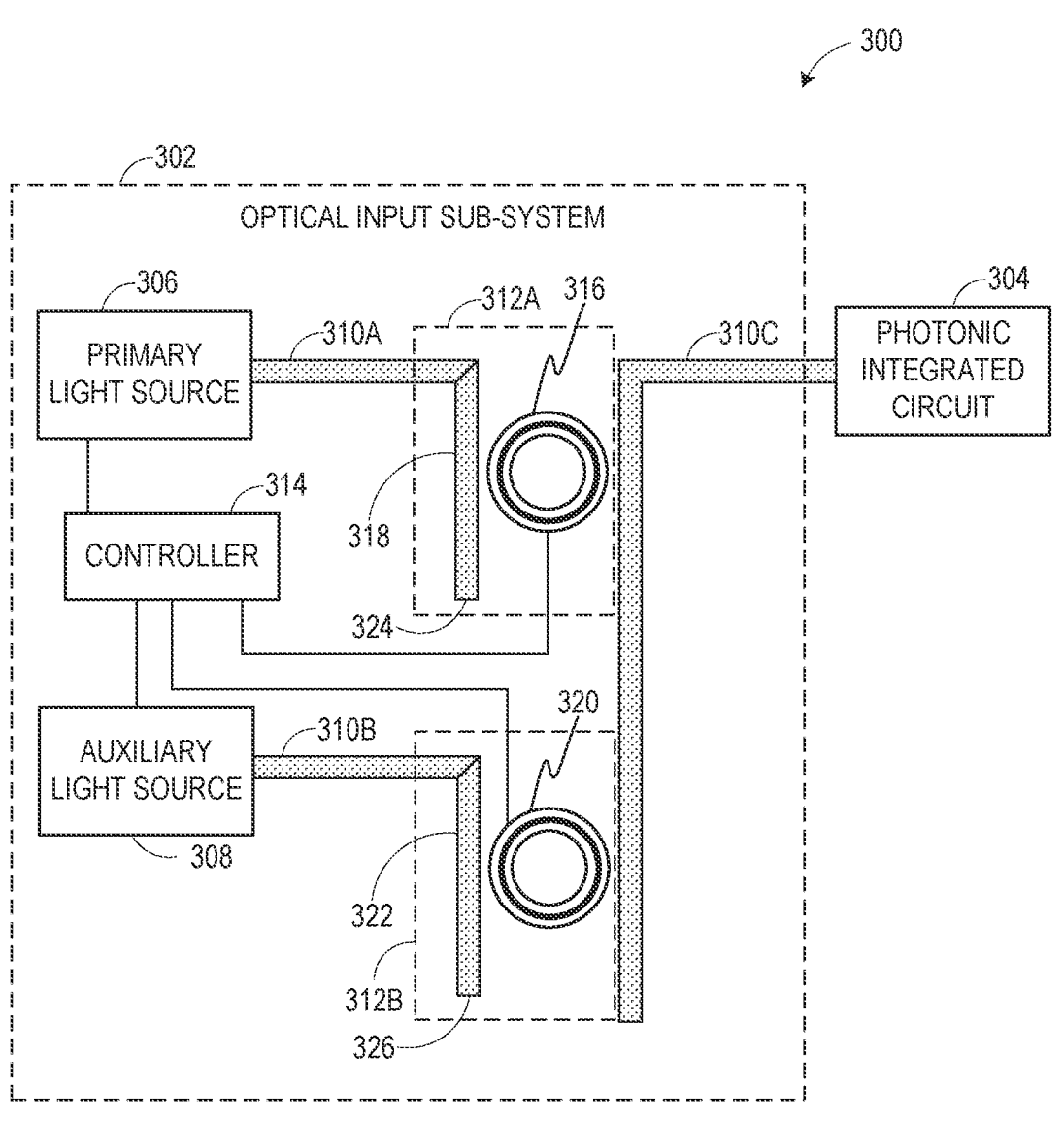
FIG. 3 depicts a schematic diagram of another example optical system.

Referring now to FIG. 3, a schematic diagram of another example optical system 300 is presented. The optical system 300 may be an example representative of the optical system 100 of FIG. 1. The optical system 300 may include one or more optical components that are similar to those described in conjunction with FIG. 1, the description of which is not repeated herein for the sake of brevity. The optical system 300 includes an optical supply sub-system 302 and a photonic integrated circuit 304. The optical supply sub-system 302 is configured to supply light to the photonic integrated circuit 304 which the photonic integrated circuit 304 uses to accomplish several operations intended to be performed by the optical system 100. The optical supply sub-system 302 and the photonic integrated circuit 304 may be example representatives of the optical supply sub-system 102 and the photonic integrated circuit 104 of FIG. 1.

The optical supply sub-system 302 may include redundant light sources, for example, a primary light source 306 and an auxiliary light source 308. During operation, the light generated by one of the primary light source 306 or the auxiliary light source 308 may be supplied to the photonic integrated circuit 304 for its intended functionalities. In the rest of the description of FIG. 3, the light generated by the primary light source 306 and the auxiliary light source 308 are referred to as a primary light and an auxiliary light, respectively. In order to supply the primary light or the auxiliary light to the photonic integrated circuit 304, the optical supply sub-system 302 includes a network of optical waveguides 310A, 310B and a common waveguide 310C, optical couplers such as a first optical coupler 312A and a second optical coupler 312B, and a controller 314. The controller 314 may be configured to control the operation of the light sources 306, 308 and the optical couplers 312A, 312B to control the supply of the primary light or the auxiliary light to the photonic integrated circuit 304.

Each of the optical couplers 312A and 312B may include a MOSCAP MRR and a coupling waveguide arm. For example, the optical coupler 312A includes a MOSCAP MRR 316 and a coupling waveguide arm 318 formed adjacent to the MOSCAP MRR 316 to allow coupling of the light between the MOSCAP MRR 316 and the coupling waveguide arm 318. Similarly, the optical coupler 312B also includes a MOSCAP MRR 320 and a coupling waveguide arm 322 formed adjacent to the MOSCAP MRR 320 to allow coupling of the light between the MOSCAP MRR 320 and the coupling waveguide arm 322. Although, not shown in FIG. 3, in some examples, open ends 324 and 326 respectively of the coupling waveguide arm 318 and 322 may be connected to light monitors (e.g., photodiodes). In some examples, the controller 314 may monitor light via such light monitors as an alternative to monitoring light via the MOSCAP MRRs 316 and 320.

The optical waveguides 310A, 310B, and 310C may couple the optical couplers 312A, 312B with other optical components. For example, the first optical coupler 312A is coupled to the primary light source 306 via the optical waveguide 310A. Similarly, the optical waveguide 310B connects the auxiliary power source 308 with the second optical coupler 312B. Further, the common bus waveguide 310C couples the first optical coupler 312A and the second optical coupler 312B to the photonic integrated circuit 304. The common bus waveguide 310C may be formed adjacent to the MOSCAP MRRs 316 and 320 to allow the coupling of the light into the common bus waveguide 310C from any of the MOSCAP MRRs 316 and 320.

Although the optical system 300 is shown to include a particular number of light sources (e.g., the two light sources 306, 308), optical couplers (e.g., the two optical couplers 312A, 312B), waveguides (e.g., the three waveguides 310A-310C), and the photonic integrated circuit (e.g., the single photonic integrated circuit 304), in some examples, the optical system 300 may be designed to include additional light sources, optical couplers, photonic integrated circuits, waveguides, etc.

The controller 314 is connected to the light sources 306, 308, and the MOSCAP MRRs 316 and 320 to control the supply of the primary light or the auxiliary light to the photonic integrated circuit 304. In particular, by adjusting control voltages applied to the MOSCAP MRRs 316 and 320, the MOSCAP MRRs 316 and 320 may be operated as optical switches. The controller 314 may operate the MOSCAP MRRs 316 and 320 in the resonance mode or the off-resonance mode in a similar fashion as described in conjunction with FIG. 1.

During the start-up of the optical system 300, the controller 314 may turn on the primary light source 306, operate the MOSCAP MRR 316 of the first optical coupler 312A in a resonance mode, and keep the auxiliary light source 308 turned off. Accordingly, the primary light generated by the primary light source 306 propagates to the first optical coupler 312A via the optical waveguide 310A. The coupling waveguide arm 318 of the first optical coupler 312A receives the primary light from the optical waveguide 310A. The MOSCAP MRR 316 operating in the resonance mode causes the primary light to constructively interfere inside the MOSCAP MRR 316. The trapped light from the MOSCAP MRR 316 may evanescently couple into the common waveguide 310C, which may in turn propagate to the photonic integrated circuit 304.

As long as the primary light source 306 operates in the first state, the controller 314 continues to operate the MOSCAP MRR 316 in the resonance mode thereby causing the primary light to propagate to the photonic integrated circuit 304. Also, for the duration that the primary light source 306 operates in the first state, the controller 314 may ensure that the auxiliary light source 308 is maintained turned-off and the MOSCAP MRR 320 is operated in the off-resonance mode. To ensure that the auxiliary light source 308 is maintained turned off, in one example, the controller 314 may not supply power to the auxiliary light source 308. Further, to ensure that the MOSCAP MRR 320 is operated in the off-resonance mode, the controller 314 may adjust the voltage applied to the MOSCAP MRR 320 until a minimum light intensity is detected in the MOSCAP MRR 320.

Based on the monitoring of the primary light, if the controller 314 detects that the primary light source 306 operates in the second state (indicating an abnormal operation of the primary light source 306), the controller 314 may turn on the auxiliary light source 308 to generate the auxiliary light. In particular, responsive to determining that the primary light source 306 operates in the second state, the controller 314 may operate the MOSCAP MRR 316 in the off-resonance mode to stop the primary light from propagating to the photonic integrated circuit 304; turn on the auxiliary light source 308; and operate the MOSCAP MRR 320 in the resonance mode. As the auxiliary light source 308 is operational and the MOSCAP MRR 320 operates in the resonance mode, the auxiliary light propagates to the photonic integrated circuit 304 via the optical waveguide 310B, the second optical coupler 312B, and the common waveguide 310C.

In the description hereinafter, various properties (e.g., refractive index change and wavelength shifts) of an example MOSCAP MRR that are useful in controlling the propagation of light are described with the help of graphical representations in FIGS. 4 and 5. For simulation experiments performed to plot the graphical representations in FIGS. 4 and 5, a MOSCAP MRR (e.g., the MOSCAP MRR 116) is designed to have a silicon-on-insulator substrate (e.g., the substrate 212 shown in FIG. 2) with 2 μm thick (e.g., height along the vertical direction 14) buried oxide (e.g., the base oxide layer 214) and 400 nm thick top silicon (e.g., the device layer 218). In particular, the device layer 218 may be uniformly p-doped with a boron concentration of $2 \times 10^{18}$ cm$^{-3}$, and the contact regions 228 and 230 are heavily doped with respective impurities. Further, the insulating layer 210 is made of Al$_2$O$_3$. The simulations of the FIGS. 4 and 5 were performed using optical waveguide design tools such as Lumerical MODE and CHARGE based on Soref's model.

Figure 4:
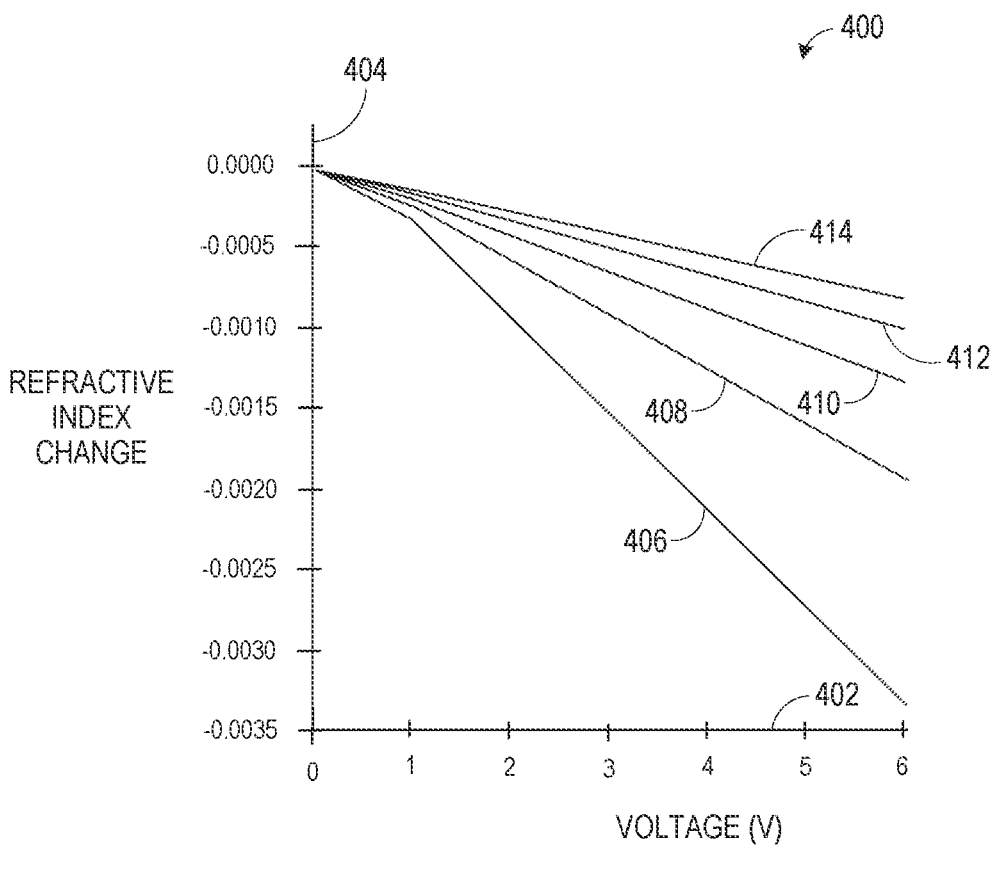
FIG. 4 depicts a graphical representation showing simulated refractive index change for an example MOSCAP MRR.

In particular, in FIG. 4, a graphical representation 400 depicting a simulated refractive index change for an example MRR MOSCAP (e.g., the MOSCAP MRR 116) is presented. The graphical representation 400 may be useful in evaluating the amount of the refractive index variation that can be caused by an applied voltage (e.g., the voltage applied to the metal contacts 232 and 234). The refractive index variation may cause the resonant wavelength of the MOSCAP MRR to vary, allowing the MOSCAP MRR to operate in any of the resonance or off-resonance modes described earlier.

In the graphical representation 400, an X-axis 402 represents voltage in volts (V), and a Y-axis 404 represents a change in the refractive index ($\Delta\eta$). Curves 406, 408, 410, 412, and 414 represent changes in the refractive index of the MOSCAP MRR with respect to the applied voltage for different thicknesses of the insulating layer 210 made of Al$_2$O$_3$. In particular, the curves 406, 408, 410, 412, and 414 represent changes in the refractive index for the insulating layer 210 for 5 nanometers (nm), 10 nm, 15 nm, 20 nm, and 25 nm, respectively. As can be observed, the increased variation in the refractive index may be obtained for smaller thicknesses of the insulating layer 210. For example, a MOSCAP MRR having the 5 nm thick insulating layer 210 may cause larger variations in the refractive index compared to the thicker 25 nm insulating layer 210. Accordingly, the insulating layer 210 of suitable thickness may be chosen based on a range of voltages that can be applied to the MOSCAP MRR.

Figure 5:
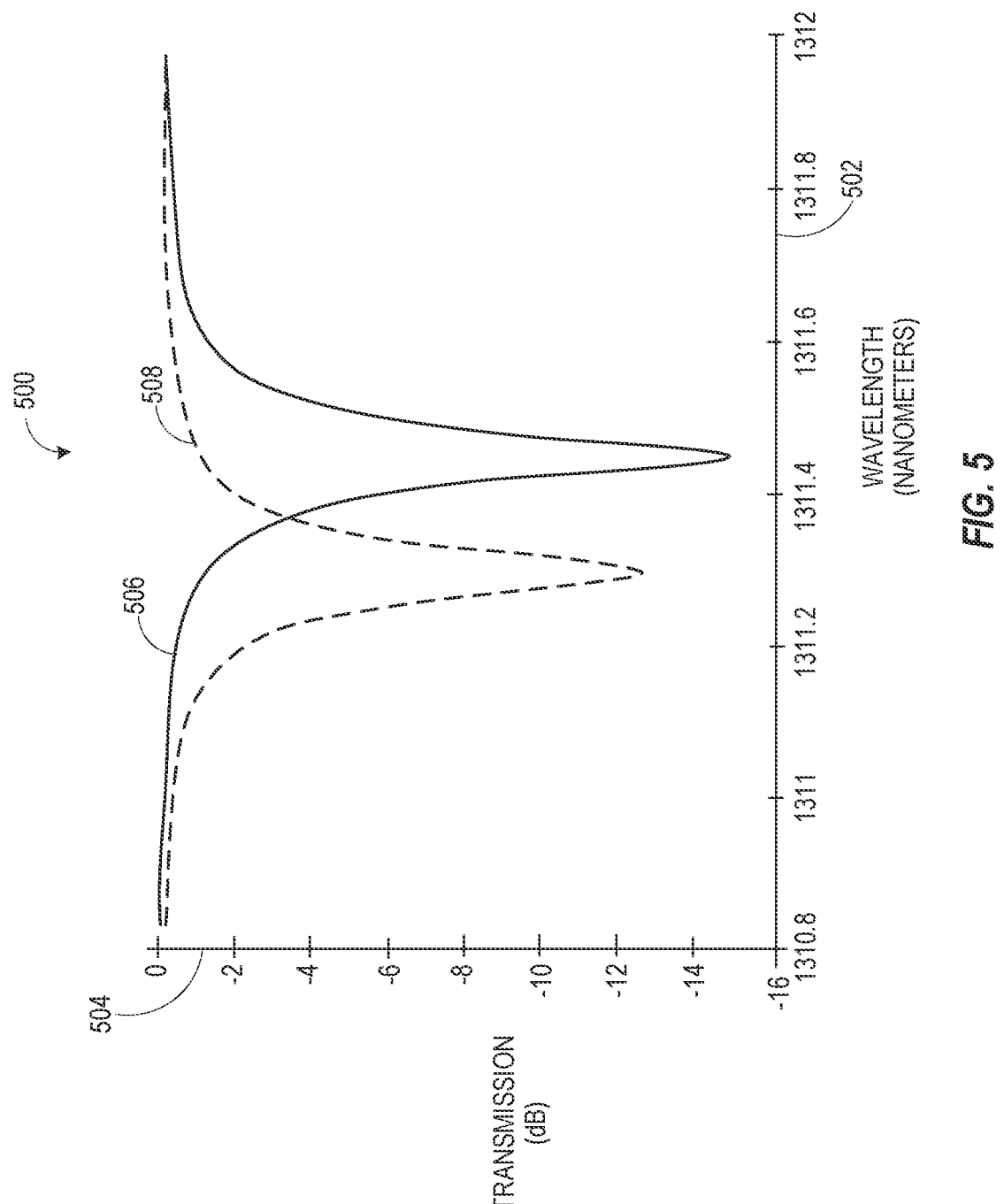
FIG. 5 depicts a graphical representation showing simulated optical output for an example MOSCAP MRR.

Referring now to FIG. 5, a graphical representation 500 showing simulated optical response for an example MOSCAP MRR (e.g., the MOSCAP MRR 116) is presented. The graphical representation 500 may be useful in understanding a wavelength shift caused by a change in the voltage applied to the MOSCAP MRR. In particular, this graphical representation 500 shows how changing the voltage can affect the resonant wavelength of the MOSCAP MRR, aiding the operation of the MOSCAP MRR in the resonance mode or off-resonance mode.

In the graphical representation 500, an X-axis 502 represents wavelength in nanometers (nm) and a Y-axis 504 represents optical power in decibels (dB). A curve 506 (represented with a solid line) represents an optical response of the example MOSCAP MRR 116 when no voltage (e.g., 0 volts) is applied across the metal contacts 232 and 234. Further, a curve 508 (represented with a dashed line) represents an optical response of the example MOSCAP MRR 116 when a voltage of magnitude 7 volts is applied across the metal contacts 232 and 234. As can be seen in the graphical representation, the curve 508 is offset from the curve 506 by about 1 nm, indicating a shift in the wavelengths.

Referring now to FIG. 6, a block diagram of an example computing system 600 is presented. Examples of the computing system 600 may include computers (stationary or portable), servers, storage systems, wireless access points, network switches, routers, docking stations, printers, or scanners. The computing system 600 may be offered as a stand-alone product or a packaged solution and can be utilized on a one-time full product/solution purchase or pay-per-use basis. The computing system 600 may include one or more multi-chip modules, for example, a multi-chip module (MCM) 602 to process and/or store data. In some examples, the MCM 602 may include a processing resource 604 and a storage device 606 mounted on a circuit board 608. In some examples, one or both of the processing resource 604 and a storage device 606 may be optional components on the MCM 602. In some examples, the MCM 602 may host an optical system 610 on the circuit board 608. In some other examples, one or more of the processing resource 604, the storage device 606, and the optical system 610 may be hosted on separate MCM (not shown). The circuit board 608 may be a printed circuit board (PCB) that includes several electrically conductive traces (not shown) to interconnect the processing resource 604, the storage device 606, and the optical system 610 with each other and/or with other components disposed on or outside of the PCB.

The optical system 610 may be an example representative of the optical system 100 of FIG. 1 or the optical system 300 of FIG. 3. The optical system 610 may include an optical supply sub-system and a photonic integrated circuit (not shown in FIG. 6) similar to those described in FIGS. 1 and 3, for example. The optical system 610 may be implemented for several applications such as data communication, optical neural networks, optical machine learning architectures, programmable photonic networks, etc.

The processing resource 604 may be a physical device, for example, one or more central processing units (CPUs), one or more semiconductor-based microprocessors, microcontrollers, one or more graphics processing units (GPUs), ASICs, FPGAs, other hardware devices, or combinations thereof, capable of retrieving and executing the instructions stored in the storage device 606. The processing resource 604 may fetch, decode, and execute the instructions stored in the storage device 606. As an alternative or in addition to executing the instructions, the processing resource 604 may include at least one IC, control logic, electronic circuits, or combinations thereof that include a number of electronic components. The storage device 606 may be any electronic, magnetic, optical, or any other physical storage device that contains or stores instructions that are readable and executable by the processing resource 604. Thus, the storage device 606 may be, for example, RAM, NVRAM, an EEPROM, a storage device, an optical disc, and the like. In some embodiments, the storage device 606 may be a non-transitory storage device, where the term "non-transitory" does not encompass transitory propagating signals.

Referring now to FIG. 7, a flowchart of an example method 700 for operating an optical system (e.g., the optical system 100) to control the supply of the light to a photonic integrated circuit (e.g., photonic integrated circuit 104) is depicted. For illustration purposes, the method 700 is described with reference to the optical system 100 of FIG. 1. Operations described herein may apply to the optical system 300 of FIG. 3 as well. In some examples, the operations described in the flowchart of FIG. 7 may be performed by a controller, such as, the controller 114. In one example, a processor in the controller may execute program instructions stored in the machine-readable storage medium to execute the operations performed by the controller. As an alternative or in addition to retrieving and executing instructions to perform the operations described in the flowcharts, the operations described in these flowcharts may be performed by implementing one or more electronic circuits that include electronic components such as an FPGA, ASIC, or other electronic circuits.

At step 702, the controller may turn on a primary light source (e.g., the primary light source 106) thereby causing the primary light source to generate a primary light. Further, at step 704, the controller may operate a first MOSCAP MRR (e.g., the first MOSCAP MRR 116) in a resonance mode. In one example, the controller may turn on the primary light source at step 702. As described in conjunction with FIG. 1, the operation of the first optical coupler causes the primary light to propagate to the photonic integrated circuit.

Furthermore, at step 706, the controller may perform a check to determine if the primary light source is operating in a first state (e.g., operating normally). In one example, to determine whether the primary light source is operating in a first state, the controller may be configured to measure the intensity of the primary light trapped inside a first MOSCAP MRR (e.g., the MOSCAP MRR 116) and compare the measured light intensity with a device specification of the primary light source for given applied power the primary light source. In certain other examples, the controller may be configured to measure the primary light via an external light monitor (not shown in FIG. 1) coupled to an open end of the optical waveguide 110D. The controller may then determine whether the primary light source is operating in the first state based on the primary light measured via such an external light monitor.

At step 706, if it is determined that the primary light source is operating in the first state, the controller, at step 708, may continue to operate the first MOSCAP MRR in the resonance mode, thereby continuing the supply of the primary light to the photonic integrated circuit. However, at step 706, if it is determined that the primary light source is not operating in the first state (i.e., operating in a second state indicating an abnormal operation of the primary light source), the controller, at step 710, may turn on an auxiliary light source (e.g., the auxiliary light source) causing the auxiliary light source to generate an auxiliary light. In some examples, if the primary light source is still operational, the controller, at step 712, may also turn off the primary light source to stop the primary light source from generating any abnormal light or operate the first MOSCAP MRR in an off-resonance mode to ensure that no portion of the primary light reaches to the photonic integrated circuit.

Further, at step 714, the controller may operate the second MOSCAP MRR in resonance mode. As described earlier, the second MOSCAP MRR operating in the resonance mode allows the auxiliary light to propagate to the photonic integrated circuit via the optical waveguide 110E, the second optical coupler 112B, the optical waveguide 110B, the first optical coupler 112A, and the optical waveguide 110C.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical supply sub-system for supplying light to a photonic integrated circuit, the optical supply sub-system comprising:
   a primary light source configured to generate a primary light;

a first optical coupler comprising a first metal-oxide-semiconductor capacitor (MOSCAP) microring resonator (MRR) and a first pair of waveguide arms formed adjacent to the first MOSCAP MRR, wherein the first optical coupler is coupled to the primary light source and the photonic integrated circuit to control propagation of the primary light to the photonic integrated circuit according to a mode of the first MOSCAP MRR that controls coupling of light between the first pair of waveguide arms;

an auxiliary light source configured to generate an auxiliary light when the primary light source malfunctions; and a second optical coupler comprising a second MOSCAP MRR and a second pair of waveguide arms formed adjacent to the second MOSCAP MRR, wherein the second optical coupler is coupled to the auxiliary light source and the first optical coupler, wherein the first MOSCAP MRR and the second MOSCAP MRR control propagation of the auxiliary light from the auxiliary light source to the photonic integrated circuit according to a mode of the second MOSCAP MRR that controls coupling of light between the second pair of waveguide arms.

2. The optical supply sub-system of claim 1, further comprising a controller connected to the primary light source, the auxiliary light source, the first MOSCAP MRR, and the second MOSCAP MRR.

3. The optical supply sub-system of claim 2, wherein the mode of the first MOSCAP MRR is resonance mode or off-resonance mode and the controller is configured to operate the first MOSCAP MRR in the resonance mode or the off-resonance mode to control the coupling of light between the first pair of waveguide arms, wherein the first pair of waveguide arms comprises a first waveguide arm and a second waveguide arm, wherein the first MOSCAP MRR when operated in the resonance mode couples the light propagating via the first waveguide arm into the second waveguide arm, and wherein the first MOSCAP MRR when operated in the off-resonance mode optically isolates the first waveguide arm from the second waveguide arm; and the mode of the second MOSCAP MRR is resonance mode or off-resonance mode and the controller is configured to operate the second MOSCAP MRR in the resonance mode or the off-resonance mode to control the coupling of light between the second pair of waveguide arms, wherein the second pair of waveguide arms comprises a third waveguide and a fourth waveguide, wherein the second MOSCAP MRR when operated in the resonance mode couples the light propagating via the third waveguide into the fourth waveguide, and wherein the second MOSCAP MRR when operated in the off-resonance mode optically isolates the third waveguide from the fourth waveguide.

4. The optical supply sub-system of claim 2, wherein the controller is configured to determine whether the primary light source is operating in a first state or a second state based on monitoring of the primary light via the first MOSCAP MRR.

5. The optical supply sub-system of claim 2, wherein the mode of the first MOSCAP MRR is resonance mode and the controller is configured to operate the first MOSCAP MRR in the resonance mode to allow the primary light to propagate to the photonic integrated circuit responsive to determining that the primary light source is operating in a first state.

6. The optical supply sub-system of claim 2, wherein the mode of the first MOSCAP MRR is resonance mode or off-resonance mode;

the mode of the second MOSCAP MRR is resonance mode or off-resonance mode; and the controller is configured to, responsive to determining that the primary light source is operating in a second state:

operate the first MOSCAP MRR in the off-resonance mode to stop the primary light from propagating to the photonic integrated circuit;

turn on the auxiliary light source; and operate the second MOSCAP MRR in the resonance mode to allow the auxiliary light to propagate to the photonic integrated circuit via the first MOSCAP MRR and the second MOSCAP MRR.

7. The optical supply sub-system of claim 2, wherein the first optical coupler and the second optical coupler are coupled to the photonic integrated circuit via a common bus waveguide.

8. The optical supply sub-system of claim 7, wherein the mode of the first MOSCAP MRR is resonance mode and, responsive to determining that the primary light source is operating in a first state, the controller is configured to operate the first MOSCAP MRR in the resonance mode to allow the primary light to propagate to the photonic integrated circuit via the common bus waveguide.

9. The optical supply sub-system of claim 7, wherein the mode of the first MOSCAP MRR is resonance mode or off-resonance mode;

the mode of the second MOSCAP MRR is resonance mode or off-resonance mode; and the controller is configured to, responsive to determining that the primary light source is operating in a second state:

operate the first MOSCAP MRR in the off-resonance mode to stop the primary light from propagating to the photonic integrated circuit via the common bus waveguide;

turn on the auxiliary light source; and operate the second MOSCAP MRR in the resonance mode to allow the auxiliary light to propagate to the photonic integrated circuit via the common bus waveguide.

10. An optical system comprising:

a photonic integrated circuit; and an optical supply sub-system coupled to the photonic integrated circuit, wherein the optical supply sub-system comprises:

a primary light source configured to generate a primary light;

a first optical coupler comprising a first metal-oxide-semiconductor capacitor (MOSCAP) microring resonator (MRR) and a first pair of waveguide arms formed adjacent to the first MOSCAP MRR, wherein the first optical coupler is coupled to the primary light source and the photonic integrated circuit to control propagation of the primary light to the photonic integrated circuit according to a mode of the first MOSCAP MRR that controls coupling of light between the first pair of waveguide arms;

an auxiliary light source configured to generate an auxiliary light when the primary light source malfunctions; and a second optical coupler comprising a second MOSCAP MRR and a second pair of waveguide arms formed adjacent to the second MOSCAP MRR, wherein the second optical coupler is coupled to the auxiliary light source and the first optical coupler, wherein the first MOSCAP MRR and the second MOSCAP MRR are configured to control propagation of the auxiliary light from the auxiliary light source to the photonic integrated circuit according to a mode of the second MOSCAP MRR that controls coupling of light between the second pair of waveguide arms.

11. The optical system of claim 10, wherein the optical supply sub-system further comprises a controller connected to the primary light source, the auxiliary light source, the first MOSCAP MRR, and the second MOSCAP MRR.

12. The optical system of claim 11, wherein the mode of the first MOSCAP MRR is resonance mode or off-resonance mode and the controller is configured to operate the first MOSCAP MRR in the resonance mode or the off-resonance mode to control the coupling of light between the first pair of waveguide arms, wherein the first pair of waveguide arms comprises a first waveguide arm and a second waveguide arm, wherein the first MOSCAP MRR when operated in the resonance mode couples the light propagating via the first waveguide arm into the second waveguide arm, and wherein the first MOSCAP MRR when operated in the off-resonance mode optically isolates the first waveguide arm from the second waveguide arm; and the mode of the second MOSCAP MRR is resonance mode or off-resonance mode and the controller is configured to operate the second MOSCAP MRR in the resonance mode or the off-resonance mode to control the coupling of light between the second pair of waveguide arms, wherein the second pair of waveguide arms comprises a third waveguide and a fourth waveguide, wherein the second MOSCAP MRR when operated in the resonance mode couples the light propagating via the third waveguide into the fourth waveguide, and wherein the second MOSCAP MRR when operated in the off-resonance mode optically isolates the third waveguide from the fourth waveguide.

13. The optical system of claim 11, wherein the mode of the first MOSCAP MRR is resonance mode and the controller is configured to operate the first MOSCAP MRR in the resonance mode to allow the primary light to propagate to the photonic integrated circuit responsive to determining that the primary light source is operating in a first state.

14. The optical system of claim 11, wherein the mode of the first MOSCAP MRR is resonance mode or off-resonance mode;

the mode of the second MOSCAP MRR is resonance mode or off-resonance mode; and the controller is configured to, responsive to determining that the primary light source is operating in a second state:

operate the first MOSCAP MRR in the off-resonance mode to stop the primary light from propagating to the photonic integrated circuit;

turn on the auxiliary light source; and operate the second MOSCAP MRR in the resonance mode to allow the auxiliary light to propagate to the photonic integrated circuit via the first MOSCAP MRR and the second MOSCAP MRR.

15. The optical system of claim 11, wherein the first optical coupler and the second optical coupler are coupled to the photonic integrated circuit via a common bus waveguide.

16. The optical system of claim 15, wherein the mode of the first MOSCAP MRR is resonance mode and, responsive to determining that the primary light source is operating in a first state, the controller is configured to operate the first MOSCAP MRR in the resonance mode to allow the primary light to propagate to the photonic integrated circuit via the common bus waveguide.

17. The optical system of claim 15, wherein the mode of the first MOSCAP MRR is resonance mode or off-resonance mode;

the mode of the second MOSCAP MRR is resonance mode or off-resonance mode; and the controller is configured to, responsive to determining that the primary light source is operating in a second state:

operate the first MOSCAP MRR in the off-resonance mode to stop the primary light from propagating to the photonic integrated circuit via the common bus waveguide;

turn on the auxiliary light source; and operate the second MOSCAP MRR in the resonance mode to allow the auxiliary light to propagate to the photonic integrated circuit via the common bus waveguide.

18. A method for supplying light to a photonic integrated circuit, the method comprising:

causing, by a controller, a primary light source to generate a primary light, wherein the primary light source is disposed in an optical supply sub-system connected to the photonic integrated circuit, wherein the primary light source is coupled to the photonic integrated circuit via a first optical coupler comprising a first metal-oxide-semiconductor capacitor (MOSCAP) microring resonator (MRR) and a first pair of waveguide arms formed adjacent to the first MOSCAP MRR, wherein the optical supply sub-system further comprises an auxiliary light source coupled to the first optical coupler via a second optical coupler, wherein the second optical coupler comprises a second MOSCAP MRR and a second pair of waveguide arms formed adjacent to the second MOSCAP MRR;

responsive to determining that the primary light source is operating in a first state, controlling, by the controller, the first MOSCAP MRR to allow the primary light to propagate the photonic integrated circuit via the first optical coupler by allowing coupling of the primary light between the first pair of waveguide arms; and responsive to determining that the primary light source is operating in a second state, turning on, by the controller, the auxiliary light source to generate an auxiliary light, and controlling the first MOSCAP MRR and the second MOSCAP MRR to allow the auxiliary light to propagate the photonic integrated circuit via the first optical coupler and the second optical coupler by optically isolating the first pair of waveguide arms and allowing coupling of the auxiliary light between the second pair of waveguide arms.

19. The method of claim 18, further comprising measuring the primary light via the first MOSCAP MRR to determine whether the primary light source is operating in the first state or the second state.

20. The method of claim 18, wherein measuring the primary light via the first MOSCAP MRR eliminates a use of external light monitors thereby making the optical supply sub-system compact.

* * * * *